United States Patent [19]
Adini

[11] Patent Number: 4,813,804
[45] Date of Patent: Mar. 21, 1989

[54] METHOD OF ATTACHING SUPPORTING ELEMENT TO STRUCTURE, AND SUPPORTING ELEMENT THEREFOR

[76] Inventor: Ari Adini, 104-20 Queens Blvd., #22J, Forest Hills, N.Y. 11375

[21] Appl. No.: 68,571

[22] Filed: Jul. 1, 1987

[51] Int. Cl.[4] ............................................. B65D 59/00
[52] U.S. Cl. ..................................... 403/12; 403/271; 228/2.5; 411/20
[58] Field of Search ................. 411/20, 171, 258, 257; 228/2.5, 107, 108, 109; 403/271, 270, 12

[56] References Cited

U.S. PATENT DOCUMENTS

| | | | |
|---|---|---|---|
| 3,987,529 | 10/1976 | Nakagawa et al. | 228/107 X |
| 4,496,096 | 1/1985 | Persson | 228/107 |
| 4,561,585 | 12/1985 | Persson | 228/2.5 X |

Primary Examiner—Andrew V. Kundrat
Attorney, Agent, or Firm—Ilya Zborovsky

[57] ABSTRACT

A supporting element is firmly attachable to a structure by detonating an explosive charge which is placed behind a body projection displaceable by an explosion of the charge to and into firm bond with the structure.

11 Claims, 1 Drawing Sheet 4,813,804

METHOD OF ATTACHING SUPPORTING ELEMENT TO STRUCTURE, AND SUPPORTING ELEMENT THEREFOR

BACKGROUND OF THE INVENTION

The present invention relates to a method of attaching a supporting element to a structure, and a supporting element provided therefor.

Supporting elements such as dowels, pins, rods and the like are widely used for attaching objects to supporting structure. Pneumatic, hydraulic or welding tool are generally utilized for attaching the supporting elements to the structure, whereupon respective objects are suspended on the thus attached supporting elements. At some locations, however, energy sources for operating such tools are not available and therefore they cannot be used. It is to be understood that this poses significant difficulties for mounting works and especially attaching the supporting elements to respective structures.

SUMMARY OF THE INVENTION

Accordingly, it is an object of the present invention to provide a method of attaching a supporting element, and a supporting element to be attached, which avoid the disadvantages of the prior art, so that a supporting element can be attached to a structure without using the above energy sources.

In keeping with these objects and with others which will become apparent hereinafter, one feature of the present invention resides in that a supporting element has a body with an inner hollow and at least one projection with a front surface attachable to a structure and a rear surface, an explosive charge is placed on the rear surface of the projection, the front surface is applied onto the structure, and the explosive charge is detonated from the inner hollow of the body, so that during the explosion the front surface becomes firmly pressed to and bonded with the structure.

When the supporting element is designed and the method is performed in accordance with the present invention, the explosion attaches the supporting element to the structure, and no additional sources of energy are needed. This significantly faciliates the mounting works and makes them possible at new and isolated locations without conventional sources of energy.

The novel features of the present invention are set forth in particular in the appended claims. The invention itself, however, will be best understood from the following description of preferred embodiments, which is accompanied by the following drawings.

DESCRIPTION OF A PREFERRED EMBODIMENT

Figure 1:
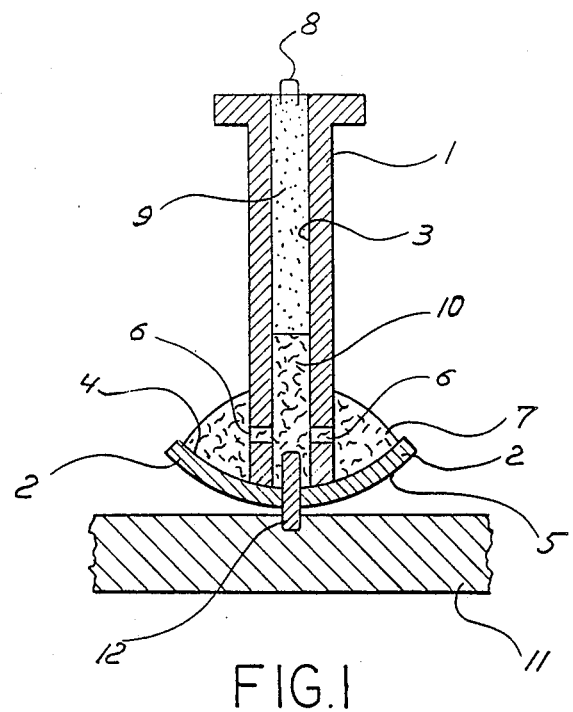
FIG. 1 is a schematic view of a supporting element in accordance with the present invention, before being attached to a supporting structure.
Figure 2:
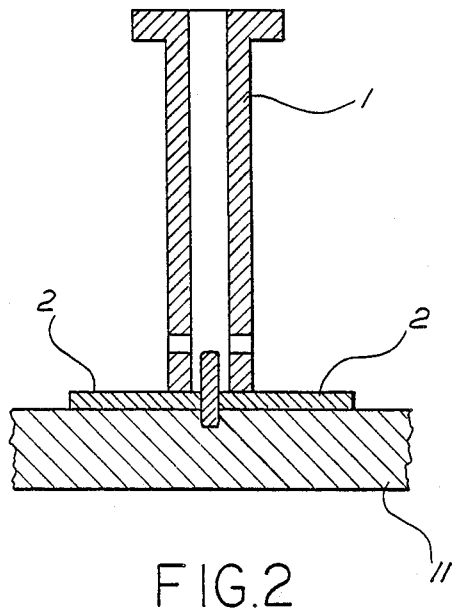
FIG.2 is a schematic view showing the inventive supporting element in the condition in which it has been attached to the supporting structure.

A supporting element in accordance with the present invention has a body part which is identified with reference numeral 1 and two projections extending substantially transversely to the body part and identified with reference numeral 2. The body part has an inner hollow 3. The projections 2 have a rear surface 4 and a front surface 5. The inner hollow 3 of the body part 1 communicates with the rear surface of the projection 2 through communicating passages 6.

As can be seen from FIG.1, the projections 2 in their initial position are somewhat curved rearwardly so as to make the rear surface 4 as a concave surface to determine a sort of depression at the rear side of the projection. An explosive charge is accommodated in the thus formed depression, as identified with reference numeral 7. The explosive charge can be for example of PETN or C-4. The inner hollow 3 of the body part 1 accommodates a fuse 8 which can be composed of PETN or C-4, a delay 9 which can be composed of any suitable material, and a detonator 10 which can be composed for example of LEDAZID or mercury fulminate.

Before the final firm attachement of the supporting element to a supporting structure which is identified with reference numeral 11, the supporting element is temporarily fixed on the structure 11. As can be seen from the drawings, this can be carried out by driving a small projection 12 provided on the supporting element, into the structure 11. This driving can be performed, for example by a hand tool. The structures to which the inventive supporting element can be attached are composed for example of any metal material, such as steel, aluminum, copper.

For permanently attaching the supporting element to the structure, the detonator 10 is activated by the fuse 8 through the delay 9, the detonating wave propagates through the passages 6 and explodes the explosive charge 7, the projections 2 are straightened up and their front surfaces 5 become firmly bonded to the supporting structure 11.

It is desirable that the projections 2 be composed of a relatively soft material, for example of carbonless steel. The projections 2 can be formed differently, for example not as two discrete projections as shown in the drawings, but instead as a single disc attached to the lower end of the body 1. It is also to be understood that the projections 2 can be formed of one piece with the body part 1.

Instead of the small projection 12 for preliminary temporary attachement of the supporting element to the structure, a regular layer of an adhesive material can be interposed between the front surfaces 5 of the projections 2 and the front surface of the structure. The adhesive material can be for example, methylacrylate.

The invention is not limited to the details shown since various modifications and structural changes are possible without departing in any way from the spirit of the invention.

What is desired to be protected by Letters Patent is set forth in particular in the appended claims.

I claim:

1. A method of attaching a supporting element to a structure, comprising the steps of providing a supporting element which has a body with an inner chamber and at least one projection having a front surface to be attached to a structure and a rear surface, said inner chamber of said body communicating with a space behind the rear surface;

placing an explosive charge on the rear surface of the projection in the space;

applying the supporting element to the structure so that the front surface of the supporting element is located close to the latter; and detonating the explosive charge from the inner chamber which communicates with the space behind the rear surface so that during an explosion of the explosive charge the front surface of the supporting element is firmly pressed to and becomes cladded to the structure.

2. A method as defined in claim 1, wherein said detonating includes introducing a detonating charge into the inner chamber and providing a passage which communicates the inner chamber with the space behind the rear surface so that upon activating of the detonating charge in the inner chamber a detonation wave propagates through the passage into the explosive charge and detonates the latter.

3. a method as defined in claim 1, wherein said placing includes forming the projection with a concave shape and retaining the explosive charge in the concave shape of the projection on the rear surface of the projection.

4. A supporting element for attaching to a structure, comprising
a body having an inner chamber;
at least one projection connected with said body and having a front surface to be attached to a structure and a rear surface;
means for communicating said inner chamber of said body with a space behind said rear surface of said projection; and
an explosive charge placed on said rear surface of said projection in said space and detonatable from said inner chamber, so that during an explosion of said explosive change the front surface of the supporting element is firmly pressed to and becomes cladded to the structure.

5. A supporting element as defined in claim 4, wherein said communicating means includes at least one passage extending through a wall of said body and communicating said inner chamber of said body with said space rear surface of said projection.

6. A supporting element as defined in claim 4; and further comprising a second such projection connected with said body and having a rear surface communicating with said inner chamber and a front surface; and second means for communicating said inner chamber with said rear surface of said second projection, said explosive charge being also placed on said rear surface of said second projection and detonatable from said inner chamber and through said second communicating means.

7. A supporting element as defined in claim 4, wherein said projection has a concave shape such that said rear surface is concave and therefore said explosive charge is retained on said rear surface.

8. A supporting element as defined in claim 4; and further comprising detonating means accommodated in said inner chamber of said body; and fusing means arranged to activate said detonating means so that the latter detonates said explosive charge from said inner chamber of said body through said communicating means.

9. A supporting element as defined in claim 4; and further comprising means for initially fixing at least one of said body and said projection to the structure, before detonating said explosive charge.

10. A supporting element as defined in claim 9, wherein said initially fixing means includes a projecting piece which is drivable into and engageable with the structure.

11. A supporting element as defined in claim 9, wherein said initially fixing means includes an adhesive layer provided on at least one of said body and said projection and adhesively connectable with the structure.

* * * * *